Patented Mar. 15, 1938

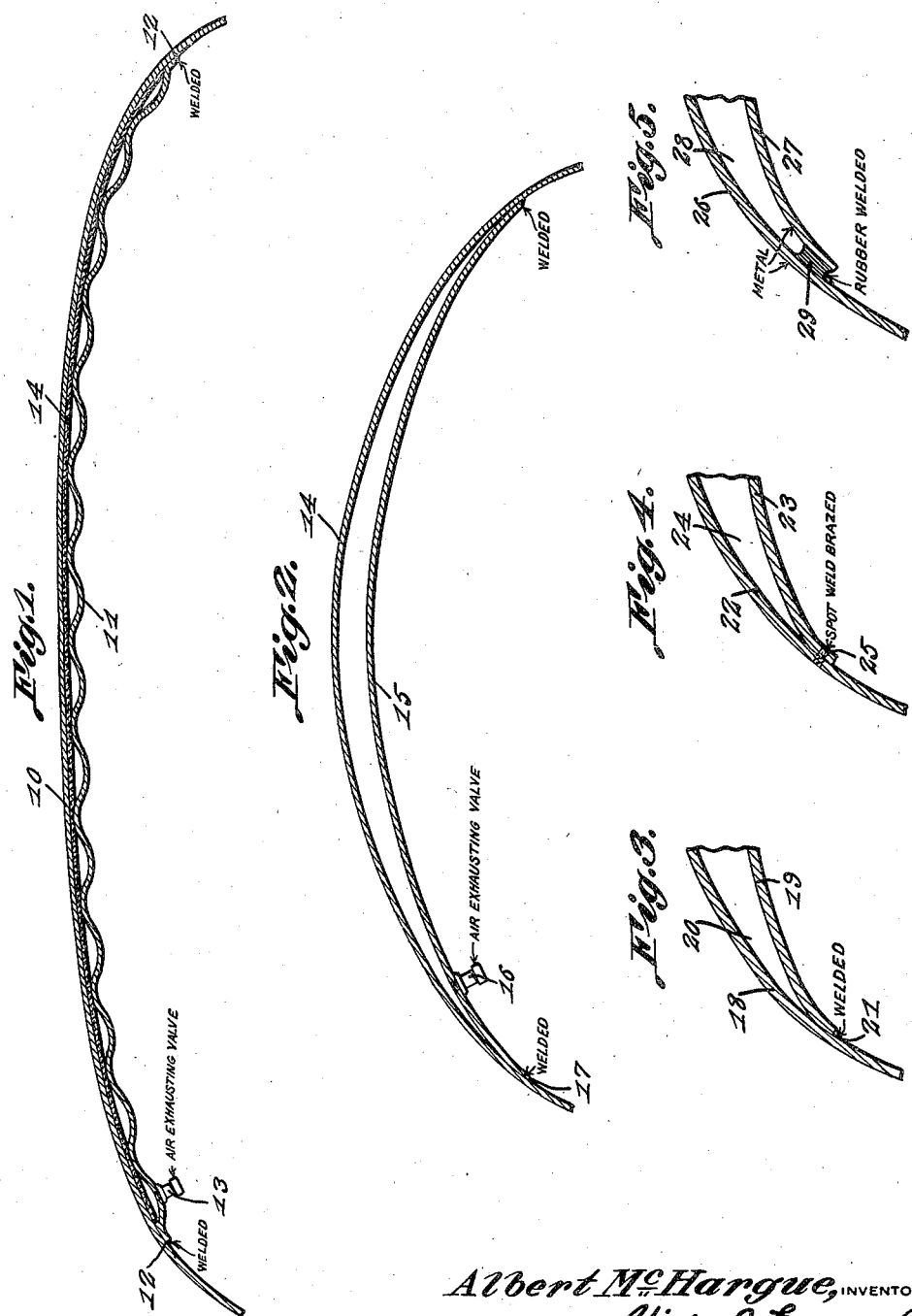

2,111,458

UNITED STATES PATENT OFFICE 2,111,458

VEHICLE TOP

Albert McHargue, Brazil, Ind.

Application January 16, 1937, Serial No. 120,988

1 Claim. (Cl. 296—137)

This invention relates to vehicle tops and has for an object to provide a vacuum insulated top for vehicles such as automobiles, trailers, trucks, air conditioned trains, aircraft, and other vehicles.

A further object is to provide a novel vehicle top comprising spaced sheets of metal welded gas tight together and having the space between them evacuated of air to insulate the top against the effects of cold, heat and noise.

A further object is to provide a vehicle top of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a sectional view of a comparatively flat vehicle top formed of two sheets of metal providing an evacuated space between them, the innermost sheet being corrugated to promote strength.

Figure 2 is a longitudinal sectional view of a modified form of top the same being more arched than shown in Figure 1 and comprising two arched sheets of metal having an evacuated space between them.

Figure 3 is a detail sectional view showing a welded joint between the metal sheets.

Figure 4 is a detail sectional view showing a spot welded brazed joint between the sheets.

Figure 5 is a detail sectional view showing a rubber welded joint between the metal sheets.

Referring now to the drawing in which like characters of reference designate similar parts in the various views, 10 and 11 designate metal sheets comprising a comparatively flat vehicle top, the innermost sheet being corrugated and both sheets having a welded joint 12 extending entirely around the peripheral edge of the inner sheet. The corrugations in the inner sheet promote strength and also provide spaces between the outer sheet and the inner sheet which may be evacuated through an exhaust valve 13. Spacer strips 14 are interposed between the outer sheet and the inner sheet to prevent contact of the sheets with each other.

In Figure 2 is shown a modified form of the invention in which two arched metal sheets 14 and 15 constitute the vehicle top and provide a space between them which may be evacuated through an air exhaust valve 16. By virtue of these sheets being arched no corrugations are needed on the inner sheet and the spacer strips may be dispensed with. A welded joint 17 connects the sheets at the peripheral edge of the inner sheet 15.

In Figure 3 there is shown a portion of a vacuum insulated top comprising outer and inner metal sheets 18 and 19 having an evacuated space 20 between them, the sheets being connected by a welded joint 21 extending entirely around the periphery of the inner sheet.

In Figure 4 there is shown a vehicle top comprising outer and inner metal sheets 22 and 23 having an evacuated space 24 between them, the sheets being connected by a spot weld brazed joint 25 extending entirely around the peripheral edge of the inner sheet and spaced somewhat inwardly from said edge.

In Figure 5 there is shown a vehicle top comprising outer and inner metal sheets 26 and 27 having an evacuated space 28 between them, the sheets being connected by a rubber welded joint 29 extending entirely around the peripheral edge of the inner sheet.

By virtue of the evacuated space between the outer and the inner metal sheets of the vehicle top the top will be insulated against heat, as well as cold, and will be also insulated against noise.

It will be pointed out that by virtue of the rubber weld shown in Figure 5 the inner sheet of metal 27 may be used as an aerial for auto radios since it is completely insulated electrically from the body of the car.

From the above description it is thought that the construction and operation of the invention will be fully understood without further explanation.

What is claimed is:

An insulated top for vehicles comprising spaced arched sheets of metal, the inner sheet being corrugated, the outer sheet being integral with the top of the vehicle, and a rubber seal secured gas tight to both sheets and forming a vacuum space between the sheets, said rubber seal insulating the inner sheet from the car body.

ALBERT McHARGUE.